US006279311B1

(12) United States Patent
Goto

(10) Patent No.: US 6,279,311 B1
(45) Date of Patent: Aug. 28, 2001

(54) COMBINED CYCLE POWER PLANT

(75) Inventor: Sadaichi Goto, Takasago (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/381,293

(22) PCT Filed: Jan. 23, 1998

(86) PCT No.: PCT/JP98/00262

§ 371 Date: Jan. 3, 2000

§ 102(e) Date: Jan. 3, 2000

(87) PCT Pub. No.: WO99/37891

PCT Pub. Date: Jul. 29, 1999

(51) Int. Cl.$^7$ .................................................. F02C 6/18
(52) U.S. Cl. ............................................................ 60/39.182
(58) Field of Search ............................ 60/39.182, 39.75; 285/156, 405

(56) References Cited

U.S. PATENT DOCUMENTS 1,811,501  *  6/1931  Holmes .................................. 285/405
4,424,668  *  1/1984  Mukherjee ......................... 60/39.182

FOREIGN PATENT DOCUMENTS 5-163960    6/1993  (JP).

* cited by examiner

Primary Examiner—Charles G. Freay
Assistant Examiner—Ehud Gartenberg
(74) Attorney, Agent, or Firm—Oblon, Spivak, McClelland, Maier & Neustadt, P.C.

(57) ABSTRACT

A combined cycle power plant is provided that carries out mixing of steams heated to a high temperature by cooling a high temperature cooled part of a gas turbine. Other steam favorably, guarantees the safety of the alternating current apparatus, so that it is operated stably over a long period of time. The combined cycle power plant is equipped with a mixing tube that mixes exit steam from a steam cooling system and a bypass steam. The exit steam from the steam cooling system that has been heated by cooling the high temperature cooled part of this gas turbine and the bypass steam that is not introduced into, but bypasses, this high temperature cooled part in order to control flow volume and temperature of the steam introduced into the high temperature cooled part are introduced into the mixing tube and mixed. Thus a mixed superheated steam having uniform pressure and temperature is formed, and there is no deleterious effect on any downstream equipment.

5 Claims, 2 Drawing Sheets

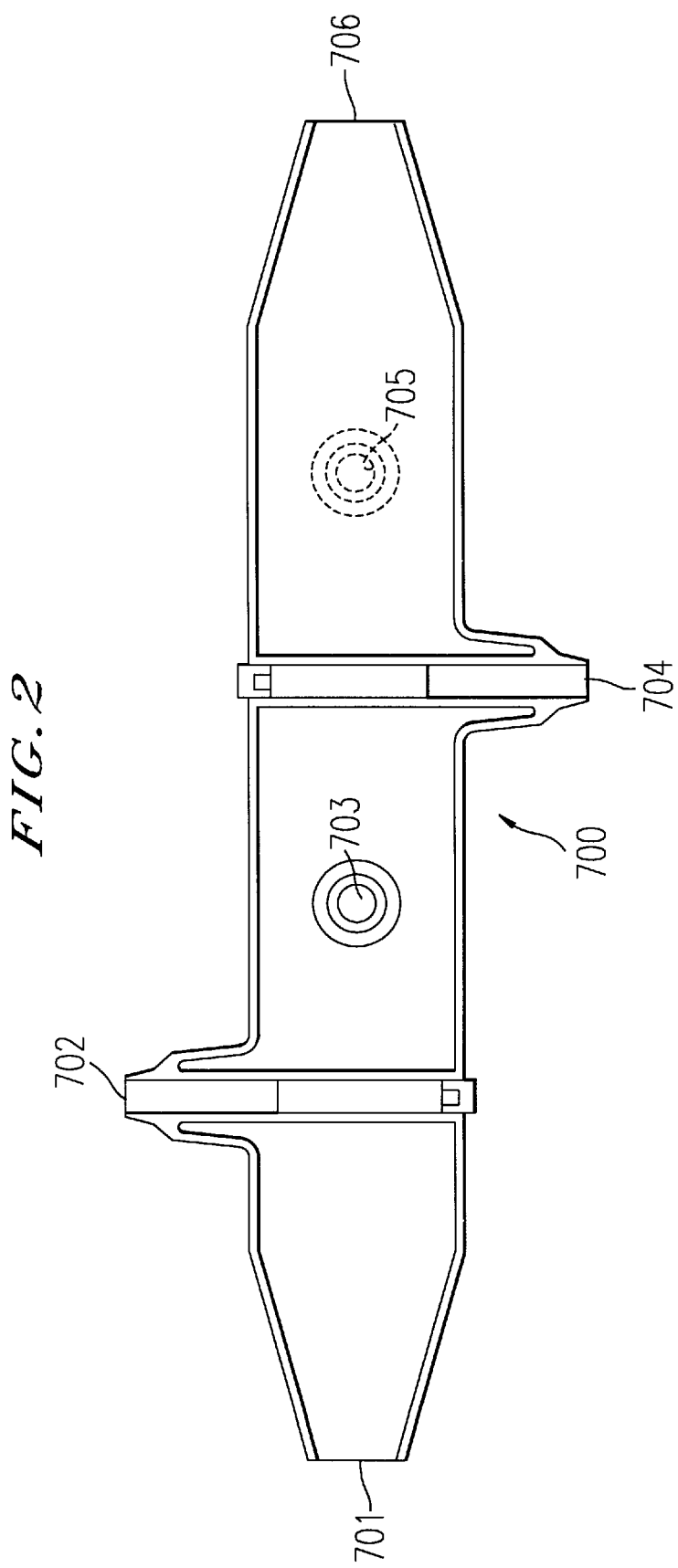

COMBINED CYCLE POWER PLANT

BACKGROUND OF THE INVENTION

1. Field of the Invention

The present invention relates to a combined cycle power plant that combines a gas turbine plant and a steam turbine plant.

2. Description of Related Art

A combined cycle power plant is a power system that combines a gas turbine plant and a steam turbine plant, and heat energy in the high temperature region is allotted to the gas turbine and heat energy in the low temperature region is allotted to the steam turbine. Heat energy is efficiently recovered and used, and recently, in particular, this power system has received much attention.

In this combined cycle power plant, research and development is advancing concerning the one point related to increasing efficiency, that is, how high the high temperature region of the gas turbine can be raised.

In contrast, in the formation of the high temperature region, it is necessary to provide a cooling system to maintain the heat resistance of the turbine structure body, and conventionally air has been used as the cooling medium in this cooling system.

However, to the extent that air is used as the cooling medium, for example, even when the high temperature region can be attained, when considering both the power loss necessary for increasing the air used in cooling to the necessary pressure by the air compressor and the result that the energy of the gas decreases because of the decreasing of the average gas temperature due to the final mixing of air used in the cooling of parts inside the turbine flow path transited by the high temperature gas, an increase over the present heat efficiencies cannot be expected at this point in time.

In order to solve this problem and implement an increase in efficiency, switching the above cooling medium in the gas turbine from gas to steam has been proposed.

One example of this is Japanese Unexamined Patent Application, First Publication, No. 05-163960. However, although the invention disclosed in this publication discloses the notion of using steam as a cooling medium in a gas turbine, there remain many problems in the details that must be thought about and solved.

For example, the steam heated to a high temperature by cooling the high temperature cooled part of the gas turbine is introduced into a intermediate pressure turbine by being mixed with steam supplied from a reheater, but currently the technology disclosed concerning this area is limited to the supply system for the working steam, and here no concrete consideration or examination is made of the location of the positions or how they are combined.

That is, attempting to cool the high temperature cooled part of the gas turbine is presently still at the trial and error stage, and actually there are many problems to be elucidated and resolved.

As described above, starting with the disclosures of Japanese Unexamined Patent Application, First Publication, No. 05-163960, as conventional technology, there is no particularly deep examination of the mixing of a plurality of steams introduced into the intermediate pressure turbine, and the inventors seem to be unaware of the problems.

However, because the respective characteristics, for example, the pressure and temperature, of the steam heated to a high temperature by cooling the high temperature cooling part of the gas turbine as described above and the steam supplied from the reheater are different, when these gases are introduced into the intermediate pressure turbine in a state of incomplete mixing, steam having high temperature or steam having a low temperature with respect to the set temperature are introduced into the turbine as they are, and there is the concern that this might cause damage to the turbine body.

In addition, when using a structure in which the plurality of mixed steams is held in the vicinity of the intermediate pressure turbine in the tubing, the amount of tubing is large and this size leads directly to an increase in cost. Furthermore, there are concerns about temperature differences in the tubing and the tubing cracking due to the thermal stress.

SUMMARY OF THE INVENTION

In consideration of the above, it is an object of the present invention to provide an apparatus that prevents the occurrence of inconveniences when mixing a plurality of steams, guarantees the safety of the apparatus, and operates stably over a long period of time.

In order to attain the above goals, in the present invention, a combined cycle power plant structured so that a gas turbine plant and a steam turbine plant are combined and an exhaust heat recovery boiler generates steam for driving the steam turbine by using the exhaust heat from the gas turbine, a steam cooling system that cools the high temperature cooled part of this turbine by the steam is provided, and the superheated steam from this steam cooling system is recovered in the steam turbine, and wherein a combined cycle power plant equipped with a mixing tube that mixes exit steam from the steam cooling system and the bypass steam is provided, the exit steam from the steam cooling system that has been heated by cooling the high temperature cooled part of this gas turbine and the bypass steam that is not introduced into, but bypasses, this high temperature cooled part in order to control the flow volume and the temperature of the steam introduced into the high temperature cooled part are introduced into the mixing tube and mixed, and thereby a mixed superheated steam having uniform pressure and temperature is formed, and this mixed superheated steam is recovered in, for example, the intermediate pressure steam turbine downstream.

In this manner, according to the present invention, a plurality of steams having different characteristics such as pressure and temperature are collected and recovered in a steam turbine, for example, an intermediate pressure turbine, downstream by forming a mixed superheated steam having uniform characteristics, and thereby it is possible to avoid unnecessary trouble such as the development of damage to the steam turbine and the development of cracks in the tube caused by unstable steam characteristics.

In addition, the present invention provides a combined cycle power plant having a mixing tube providing steam inlets from the tube ends and steam inlets on the tube sides and disposing the inlets on the tube sides so as to leave gaps longitudinal to the tube, and at the same time the neighboring inlets are mutually disposed so as to define circumferential angles, and these installation positions of the steam inlets are separated from the tube ends and on the tube sides, and furthermore, those inlets from the tube sides are disposed so as to leave a longitudinal gap therebetween, and at the same time, neighboring inlets are mutually disposed so as to define circumferential angles, and thereby the plurality of steams having different characteristics entering from the respective steam inlets can be well mixed so as to have a uniform character.

In this manner, according to the present invention, when forming this mixed superheated steam, by specifying the positional relationships between the plurality of steams entering the mixing tube, the uniform mixing of the plurality of steams having differing characteristics can be reliably facilitated, and the stability of the above described steam turbine can be guaranteed, and it is possible to obtain a stable and reliable system.

BRIEF DESCRIPTION OF THE DRAWINGS

FIG. 2 is a drawing showing in detail the structure of the mixing tube in FIG. 1.

DETAILED DESCRIPTION OF THE INVENTION

Figure 1:
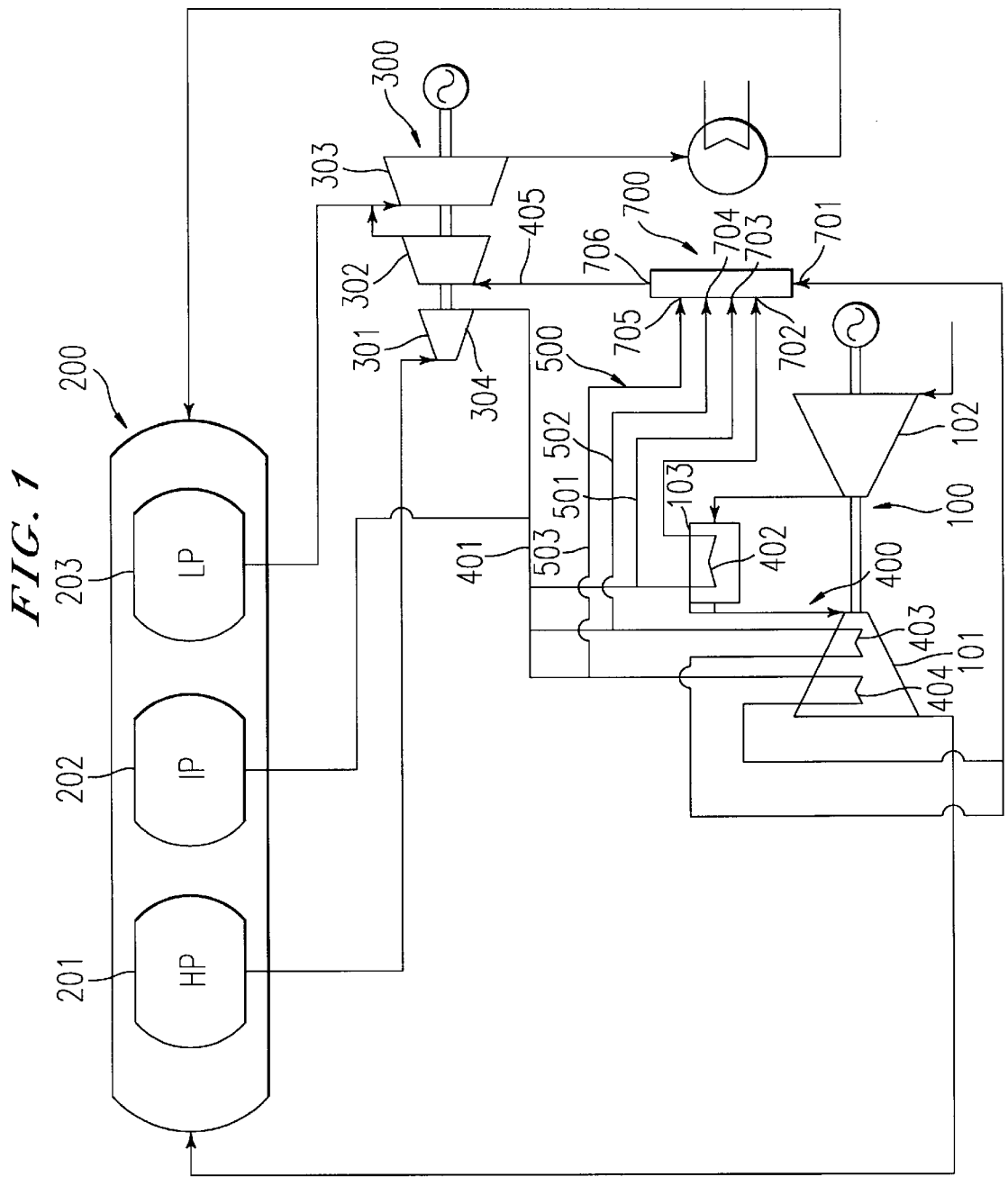
FIG. 1 is a drawing of the combined cycle power plant according to the embodiment of the present invention.

The preferred embodiment of the present invention will be explained with reference to FIG. 1 and FIG. 2.

A gas turbine plant 100 is formed by its major components: a gas turbine 101, an air compressor 102 that drives this gas turbine 101, and a combustion chamber 103 that combusts the compressed air supplied from the air compressor 102 with fuel.

An exhaust heat recovery boiler 200 is formed by its major components: a high pressure steam generator 201 an intermediate pressure steam generator 202 and a low pressure steam generator 203 that use the exhaust gas from the gas turbine 101 as a heating source.

A steam turbine plant 300 is formed by its major components: a high pressure turbine 301 that is supplied high pressure steam from the exhaust heat recovery boiler 200, an intermediate pressure turbine 302 that is supplied steam from the steam recovery system 405 described below, and a low pressure turbine 303 that is supplied low pressure steam from the exhaust heat recovery boiler 200.

A steam cooling system 400 is formed by its major components: a cooling steam supply system 401 connected to an exhaust port 304 of the high pressure turbine 301, a first steam cooling system 402 that branches from the cooling steam supply system 401 and cools the combustion chamber 103, and a second and third steam cooling systems 403 and 404 that branch respectively in the same manner from this cooling steam supply system 401 and cool the high temperature cooled part of the gas turbine 101.

A bypass system 500 is formed by first, second, and third bypass systems 501, 502, and 503, that are parallel to each cooling system for controlling the flow volume and the temperature of the steam introduced to the first through third steam cooling systems 402, 403, and 404.

A mixing tube 700 has steam inlet 701 on one tube end and a plurality of steam inlets 702, 703, 704 and 705 on the tube sides. The steam inlet 701 on the tube end communicates with the systems of the second and third steam cooling systems 403 and 404 that cool the high temperature cooled part of the gas turbine 101, the steam inlet 702 on the tube sides communicates with the system of the first steam cooling system 402 for cooling said combustion chamber. The other steam inlets 703, 704 and 705 on the tube sides bypass the first through third steam cooling systems 402, 403 and 404 and receive a supply of bypass steam flowing through the first through third bypass systems 501, 502 and 503.

A steam outlet 706 is provided on the end opposite to the steam inlet 701 and communicates with the inlet of the intermediate pressure turbine 302 via the steam recovery system 405.

In addition, the steam inlets 702, 703, 704 and 705, on the tube sides are disposed so as to leave longitudinal gaps and to define 90° angles circumferentially.

Moreover, there are four steam inlets 702 through 705 on the tube sides, separated into upstream and downstream, and they are disposed offset by angles of 90° circumferentially, but the invention is not limited to these dimensions, separation gaps, or directions, and appropriate alterations in the 90° angle or any space therebetween can be made depending on the number of mixing steam sources, their characteristics, etc.

FIG. 1 shows simply schematically the position at which the mixing tube 700 is installed. Actually, it is preferable that it be positioned as close as possible to the steam outlet of the high temperature cooled part of the gas turbine 101, and as a result, arranged so that the distance from the steam outlet 706 and the intermediate pressure turbine 302 is as far as possible.

Since the embodiment has the above-described structure, the exit steam from the second and third steam cooling systems 403 and 404 heated by cooling the high temperature cooled part of the gas turbine 101 is supplied to the mixing tube 700 from the steam inlet 701 of the tube end. This steam and the exit steam supplied to the mixing tube 700 via the steam inlet 702 on the tube sides from the first steam cooling system 402 by cooling the combustion chamber 103, and the bypass steam supplied to the mixing tube 700 from the steam inlets 703, 704 and 705 on the tube sides via the first through third bypass systems 501, 502 and 503 respectively, are turned into the mixed superheated steam by being mixed in the mixing tube 700.

At this time, as shown in FIG. 2, the exit steam entering from the steam inlet 701 on the tube end progresses in the axial direction of the mixing tube 700, with respect to the flow of this steam, the steams supplied from the steam inlet 702 on the tube sides and these other steam inlets 703 through 705 are sequentially mixed at different positions along the direction of the flow because these steam inlets 702, 703, 704 and 705 are placed leaving gaps in the longitudinal direction of the mixing tube 700 and at the same time are disposed so as to define at 90° angles in the circumferential direction (or any spaces). Thus the steams having differing characteristics entering from the respective steam inlets 701, 702, 703, 704 and 705 are well mixed and can form a mixed superheated steam having a uniform pressure and temperature at the steam outlet 706.

It is possible to connect the path after the mixing tube 700 to the intermediate turbine 302 seen in FIG. 1 with a minimum usage of the connecting tube, since this mixing operation is carried out summarizingly just after the high temperature cooled part of the gas turbine 101 by disposing the mixing tube 700 at the position as close as possible to the outlet, so that homogenization of the mixed superheated steam can be accelerated and the reduced consumption of the connecting tube contributes to cost reduction of the present system.

In this manner, according to the present embodiment, by specifying the positional relationships between a plurality of steams entering the mixing tube 700, the characteristics of the mixed superheated steam recovered in the intermediate pressure turbine 302 are uniform. Also it is possible to prevent damage to the intermediate pressure turbine 302 and avoid unnecessary trouble of generating cracks in the tube. The stability of the intermediate turbine 302 is guaranteed, and a stable and reliable system can be obtained. Furthermore, this stability contributes to a significant reduction in cost by reducing the amount of tubing.

The present invention was explained by the embodiment in FIGS. 1 and 2, but the present invention is not limited to this embodiment. Within the scope of the present invention various alterations of the concrete structure can be made.

What is claimed is:

1. A combined cycle power plant comprising:

a gas turbine;

a boiler connected to an exhaust heat line from the gas turbine, said boiler having a high-pressure steam generator, an intermediate-pressure steam generator and a low-pressure steam generator;

a mixing tube connected to an exit steam line from the gas turbine and also connected to a steam bypass line from the intermediate-pressure steam generator of the boiler; and a steam turbine plant having a high-pressure turbine connected by one steam line to the high-pressure steam generator of the boiler, an intermediate-pressure turbine connected to a superheated steam recovery line from the mixing tube, and a low-pressure turbine connected by another steam line to the low-pressure steam generator of the boiler.

2. A combined cycle power plant according to claim 1, wherein:

said mixing tube has one steam inlet at one tube end and a plurality of other steam inlets at a plurality of tube sides, said other steam inlets being spaced from each other along a longitudinal direction of the mixing tube, and each of the other steam inlets being disposed at an angle circumferentially from an adjacent one of the other steam inlets.

3. A combined cycle power plant comprising:

a gas turbine;

a boiler connected to an exhaust heat line from the gas turbine, said boiler having a high-pressure steam generator, an intermediate-pressure steam generator and a low-pressure steam generator;

a steam turbine plant having a high pressure turbine connected by one steam line to the high-pressure steam generator of the boiler, an intermediate-pressure turbine connected to a superheated steam recovery line from a mixing tube, and a low-pressure turbine connected by another steam line to the low-pressure steam generator of the boiler;

a steam cooling system formed by a cooling steam supply system connected to an exit of the high-pressure turbine, a first steam cooling system for cooling a combustion chamber, and a second and a third steam cooling system for cooling a high-temperature cooled part of the gas turbine; and a bypass system formed by first, second and third bypass systems that are parallel to each cooling system for controlling flow volume and temperature of steam introduced to the first, second and third steam cooling systems;

wherein said mixing tube has a steam inlet on a tube end which communicates with said second and third steam cooling systems, and a plurality of steam inlets on a tube side for receiving a supply of bypass steam flowing through the bypass system; and further wherein said mixing tube mixes superheated outlet steam from the high-temperature cooled part of the gas turbine and bypass steam from the second and third bypass systems, and steam mixed by the mixing tube is recovered by the steam turbine plant downstream.

4. A combined cycle power plant according to claim 3, wherein the mixing tube is positioned in the vicinity of a steam outlet of the high-temperature cooled part of the gas turbine.

5. A combined cycle power plant according to claim 3, wherein:

said mixing tube has one steam inlet at one tube end and a plurality of other steam inlets at a plurality of tube sides, said other steam inlets is spaced from each other along a longitudinal direction of the mixing tube, and each of the other steam inlets is disposed at an angle circumferentially from an adjacent one of the other steam inlets.

\* \* \* \* \*

UNITED STATES PATENT AND TRADEMARK OFFICE
CERTIFICATE OF CORRECTION

PATENT NO. : 6,279,311 B1
DATED : August 28, 2001
INVENTOR(S) : Takaoka et al.

It is certified that error appears in the above-identified patent and that said Letters Patent is hereby corrected as shown below:

<u>Title page,</u>
Item [12] should read:
[12] **United States Patent
Takaoka et al.**

Item [75], the inventor's names should read:
[75] Inventors: Kazuhiko Takaoka; Sadaichi Goto; Hiroyuki Yamamoto, all of Takasago-shi (JP)

Signed and Sealed this

Fourteenth Day of May, 2002

JAMES E. ROGAN
*Director of the United States Patent and Trademark Office*

*Attest:*

*Attesting Officer*